(12) United States Patent
Sakoda et al.

(10) Patent No.: US 9,003,634 B2
(45) Date of Patent: Apr. 14, 2015

(54) BLIND RIVET AND FASTENING METHOD THEREOF

(75) Inventors: Kanji Sakoda, Toyohashi (JP); Takanori Makino, Toyohashi (JP)

(73) Assignee: Newfrey LLC, Newark, DE (US)

(*) Notice: Subject to any disclaimer, the term of this patent is extended or adjusted under 35 U.S.C. 154(b) by 165 days.

(21) Appl. No.: 13/444,120

(22) Filed: Apr. 11, 2012

(65) Prior Publication Data

US 2012/0260490 A1 Oct. 18, 2012

(30) Foreign Application Priority Data

Apr. 12, 2011 (JP) .................................. 2011-87960

(51) Int. Cl.
*F16B 19/08* (2006.01)
*F16B 19/10* (2006.01)
*F16B 5/04* (2006.01)
*F16B 43/00* (2006.01)

(52) U.S. Cl.
CPC ........ *F16B 19/1045* (2013.01); *Y10T 29/49956* (2015.01); *F16B 5/04* (2013.01); *F16B 19/1054* (2013.01); *F16B 43/00* (2013.01)

(58) Field of Classification Search
USPC ................. 29/34 B, 243.521, 243.53, 524.1, 29/525.06, 812.5; 411/34–42, 55, 70, 360, 411/361, 432, 501
See application file for complete search history.

(56) References Cited

U.S. PATENT DOCUMENTS

| | | | | |
|---|---|---|---|---|
| 4,585,382 A * | 4/1986 | Bryce, Jr. | ......................... | 411/34 |
| 4,865,499 A * | 9/1989 | Lacey | ............................. | 411/34 |
| 5,178,502 A | 1/1993 | Sadri | | |
| 7,156,596 B2 * | 1/2007 | Makino | .......................... | 411/34 |
| 2004/0234358 A1 * | 11/2004 | Genick | ......................... | 411/533 |
| 2009/0110510 A1 * | 4/2009 | Cairo et al. | ................... | 411/197 |

FOREIGN PATENT DOCUMENTS

| | | |
|---|---|---|
| EP | 0663535 A | 7/1995 |
| JP | 59-116618 U | 8/1984 |
| JP | 63-87312 U | 6/1988 |

OTHER PUBLICATIONS

Tec-N-Tec, Inc. Jun. 2008.*
Taylor Special Steels, Feb. 2011.*

* cited by examiner

*Primary Examiner* — David Bryant
*Assistant Examiner* — Lee A Holly
(74) *Attorney, Agent, or Firm* — Michael P. Leary

(57) ABSTRACT

A blind rivet is adapted for fastening two members, each member having a plurality of fastening holes arranged in corresponding positions. The inner diameter of the holes in the second member are greater than the inner diameter of the holes in the first member to compensate for positioning errors that may occur during machining. The blind rivet includes a rivet body having a sleeve, a rivet head, and a through hole; a mandrel having an elongated stem and a head; and a washer. The washer is arranged around the outer circumferential surface of the sleeve in the rivet body and adjacent to the rivet head. The members to be fastened are fastened between the enlarged end of the sleeve and the washer.

5 Claims, 4 Drawing Sheets

BLIND RIVET AND FASTENING METHOD THEREOF

CROSS-REFERENCE TO RELATED APPLICATIONS

This application claims priority from Japanese Patent Application No. 2011-087960, filed on Apr. 12, 2011, the disclosure of which is incorporated herein by reference.

BACKGROUND OF THE INVENTION

The present invention relates to a blind rivet. More specifically, it relates to a blind rivet and fastening method thereof able to fasten a plurality of members to be fastened having large fastening holes using a blind rivet having a washer.

As is well known, a blind rivet includes a hollow metal rivet body having a sleeve and a rivet head on one end of the sleeve, and a metal mandrel having a stem passing through and extending from a through-hole in the rivet body. A blind rivet has the advantage of enabling a plurality of members to be fastened to be worked and fastened from one side.

The rivet body of the blind rivet has a cylindrical hollow sleeve in which a rivet head has been formed on one end and which extends from the rivet head. The mandrel of the blind rivet has a head on one end whose diameter is larger than the inner diameter of the sleeve, and has a stem passing through the rivet body. The mandrel is arranged so that the head of the mandrel is adjacent to the end of the sleeve opposite that of the rivet head, and the stem of the mandrel is inserted into the through-hole in the rivet body so as to extend from the rivet head and complete the assembly of the blind rivet. The assembled blind rivet is inserted into holes in members to be fastened such as panels with the mandrel head at the forward-facing end, and the rivet head is brought into contact with the portion of the member to be fastened surrounding the hole. When the rivet head is held by a fastening tool in this state, and the stem of the mandrel is gripped and pulled out from the rivet head side, the sleeve end of the rivet body is deformed so as to become enlarged in diameter, the mandrel breaks off in the elongated breakable portion of the stem, and the members to be fastened can be fastened between the rivet head and the enlarged end of the sleeve.

As is well known, in a blind rivet, after the mandrel has been pulled out and the sleeve end of the rivet body has been enlarged, the rivet head is squeezed from the outer circumferential surface by the nosepiece of the fastening tool, and the inner circumferential surface of the rivet head engages the stem of the mandrel and is secured. Because the rivet head is squeezed and pushed out in the axial direction, the blind rivet can fasten the members to be fastened in the axial direction with strong crimping force.

However, because the rivet head is to be squeezed, the outer diameter of the rivet head cannot be increased. In a blind rivet, the outer diameter of the rivet head is supposed to be greater than the inner diameter of the holes in the members to be fastened. If the outer diameter of the rivet head were smaller than the inner diameter of the holes in the members to be fastened, the panels could not be fastened.

In a case in which a member to be fastened such as an automobile body panel is fastened to another member to be fastened using a blind rivet, the positions of a plurality of fastening holes in one of the members to be fastened are aligned with the positions of a plurality of fastening holes in the other member to be fastened, and the members to be fastened are fastened with a blind rivet in each fastening hole. Generally, the inner diameter of the fastening holes in one of the members to be fastened (the blind side) is somewhat larger than the outer diameter of the hollow sleeve of the rivet body. The inner diameter of the fastening holes in the other member to be fastened (working side) is larger than the fastening holes in the member to be fastened on the blind side. These fastening holes (clearance holes) compensate for any position error in the fastening holes of the members to be fastened. Thus, members to be fastened in which the inner diameter of one of the members to be fastened is greater than the inner diameter of the other member to be fastened cannot be fastened together using a blind rivet in which the outer diameter of the rivet head is small.

This problem can be solved using a blind rivet in which a flange having a large outer diameter is integrally formed with the rivet head. Members to be fastened having fastening holes with a large inner diameter can be fastened using one of these blind rivets. However, when two members to be fastened are fastened together using a rivet body having a large-diameter flange, the two members to be fastened cannot be fastened together with sufficient crimping force.

When a blind rivet is fastened by squeezing the rivet head, the rivet head is squeezed by the nosepiece of the fastening tool and the rivet head is pushed out in the axial direction. This action forcibly interposes the two members to be fastened between the rivet head pushed out in the axial direction and the enlarged end of the sleeve, generating crimping force.

However, when a flange is integrally formed with the rivet head, the force pushing out the rivet head in the axial direction is blocked by the flange. As a result, crimping force strong enough to crimp the members to be fastened is not generated, and sufficient fastening force cannot be obtained.

PRIOR ART PATENT DOCUMENTS

Patent Document 1—Published Unexamined Utility Model Application No. 63-87312
Patent Document 2—Published Unexamined Patent Application No. 63-254212
Patent Document 3—Published Unexamined Patent Application No. 5-149313

A blind rivet with a spring washer is disclosed in Patent Document 1. In Patent Document 1, the blind rivet is a fastening tool including a hollow rivet having a brim and a cylinder, and a mandrel having a head and a stem. A groove is formed in the brim-side end of the cylinder of the hollow rivet, and a spring washer is provided in this groove. When the stem of the mandrel is pulled and members to be fastened are fastened between the brim and the mandrel head, the spring washer is interposed between the end of the cylinder and a member to be fastened, and the members to be fastened are fastened together securely.

In the blind rivet of Patent Document 1, the outer diameter of the spring washer and the outer diameter of the brim are the same, so members to be fastened having large fastening holes cannot be fastened together. Also, a groove has to be formed in the cylinder to insert the spring washer.

A self-blocking blind rivet is disclosed in Patent Document 2 in which a cylindrical head is deformed during fastening and enters a locking groove in the stem core to block the hole in the rivet body. The blind rivet in Patent Document 2 includes a rivet body having a trunk and a flanged rivet head on one end, a plug with threaded grooves connected to a stem core tail via a bendable portion, and a stem core having an end. When the blind rivet is fastened, the material in the rivet head enters the threaded groove. When the rivet head is rotated, it is relatively easy to unfasten the rivet.

Because the flange is integrated with the rivet head, the blind rivet in Patent Document 2 can fasten together members to be fastened having fastening holes with a larger inner diameter. However, when members to be fastened are fastened together using a blind rivet having a flange with a large outer diameter as described above, the members to be fastened cannot be fastened together with sufficient crimping force.

A blind fastener is disclosed in Patent Document 3 including a pin member having a plurality of locking grooves, a main sleeve, an expandable sleeve, a collar, and a separate washer. The expandable sleeve expands in the radial direction and moves over the main sleeve, the collar is swaged in the locking grooves, and a plurality of work pieces is secured. The separate washer is fitted over the pin member.

The blind fastener in Patent Document 3 has five components: a pin member, a main sleeve, an expandable sleeve, a collar, and a separate washer. The collar swaged in the locking grooves is a separate component from the main sleeve and the expandable sleeve. This has more components and a different structure compared to a conventional blind rivet. As a result, the machining and assembly costs related to the components are greater.

Even without the washer, the blind fastener in Patent Document 3 is able to fasten together members to be fastened in which the inner diameter of the fastening holes is larger in order to compensate for any position error in the fastening holes of the members to be fastened.

Therefore, there is demand for a blind rivet able to fasten together members to be fastened with sufficient crimping force, even when the inner diameter of the fastening hole in the members to be fastened is larger than the outer diameter of the rivet head, and able to reduce the number of components and make the fastening process easier.

There is also demand for a blind rivet able to fasten together members to be fastened with sufficient crimping force, even when the inner diameter of the fastening holes in one of the members to be fastened is larger than the inner diameter of the fastening holes in the other member to be fastened in order to compensate for any position error in the fastening holes of the members to be fastened.

SUMMARY OF THE INVENTION

Therefore, an object of the present invention is to provide a blind rivet able to fasten together members to be fastened with sufficient crimping force, even when the inner diameter of the fastening hole in the members to be fastened is larger than the outer diameter of the rivet head, and able to reduce the number of components and make the fastening process easier.

Another object of the present invention is to provide a blind rivet able to fasten together members to be fastened with sufficient crimping force, even when the inner diameter of the fastening holes in one of the members to be fastened is larger than the inner diameter of the fastening holes in the other member to be fastened in order to compensate for any position error in the fastening holes of the members to be fastened.

In order to achieve these objects, the blind rivet of the present invention has three components: a rivet body, a mandrel, and a washer. The rivet head of the rivet body is squeezed, and the stem of the mandrel is engaged. The washer is attached with respect to the rivet body so as to be able to rotate and slide. The washer is made from a material that is harder than the rivet body. The material, thickness, and shape of the washer are determined so the members to be fastened can be fastened using strong crimping force.

A first aspect of the present invention is a blind rivet for fastening together a first member to be fastened having a plurality of first fastening holes, and a second member to be fastened having a plurality of second fastening holes arranged on the working side of the first member to be fastened in positions corresponding to the first fastening holes, the second fastening holes having an inner diameter greater than the inner diameter of the first fastening holes so as to be able to compensate for any position error that may occur during the machining of the first fastening holes and the second fastening holes, in which the blind rivet includes:

a rivet body having a hollow sleeve, a rivet head formed on one end of the sleeve, and a through-hole formed so as to pass through the rivet body from the sleeve-side end to the rivet head-side end, a mandrel having an elongated stem whose outer diameter is smaller than the inner diameter of the sleeve and whose length is greater than the rivet body, and a head whose outer diameter is greater than the inner diameter of the sleeve, and a washer whose inner diameter is smaller than the outer diameter of the rivet head and greater than the outer diameter of the sleeve in the rivet body, and whose outer diameter is greater than the outer diameter of the rivet head; and in which the head of the mandrel is arranged adjacent to the sleeve-side end of the rivet body, the stem of the mandrel passes through the through-hole in the rivet body and extends from the rivet head-side end, and the washer is arranged around the outer circumferential surface of the sleeve in the rivet body and adjacent to the rivet head.

The two members to be fastened can be fastened together even when the inner diameter of the fastening hole in the member to be fastened on the working side is formed so as to be larger than the inner diameter of the fastening hole in the member to be fastened on the blind side in order to compensate for any position error in the fastening holes of the members to be fastened.

Preferably, the blind rivet is inserted into first and second fastening holes in the first and second members to be fastened from the head of the mandrel, a surface of the washer is brought into contact with a portion of the second member to be fastened surrounding the second fastening hole and, when the rivet head is supported and the stem of the mandrel is pulled out from the rivet head side, the end of the sleeve is pushed by the mandrel head, the diameter of the end of the sleeve is enlarged, the rivet head is squeezed from the outer circumferential surface, the inner diameter of the rivet head engages the stem of the mandrel, and the first and second members to be fastened are fastened between the enlarged end of the sleeve and the washer.

Because the rivet head is squeezed from the outer circumferential surface and pushed out, the force pushing out the rivet head is not impeded by the washer. As a result, the members to be fastened can be fastened together using sufficient crimping force.

A second aspect of the present invention is a blind rivet for fastening together a plurality of members to be fastened having fastening holes, in which the blind rivet includes:

a rivet body having a hollow sleeve, a rivet head formed on one end of the sleeve, and a through-hole formed so as to pass through the rivet body from the sleeve-side end to the rivet head-side end, a mandrel having an elongated stem whose outer diameter is smaller than the inner diameter of the sleeve and whose length is greater than the rivet body, and a head whose outer diameter is greater than the inner diameter of the sleeve, and a washer whose inner diameter is smaller than the outer diameter of the rivet head and greater than the outer diameter of the sleeve in the rivet body, and whose outer diameter is greater than the outer diameter of the rivet head;

in which the head of the mandrel is arranged adjacent to the sleeve-side end of the rivet body, the stem of the mandrel passes through the through-hole in the rivet body and extends from the rivet head-side end, and the washer is arranged around the outer circumferential surface of the sleeve in the rivet body and adjacent to the rivet head; and in which the blind rivet is inserted into fastening holes in the members to be fastened from the head of the mandrel, a surface of the washer is brought into contact with a portion of the second member to be fastened surrounding the second fastening hole and, when the rivet head is supported and the stem of the mandrel is pulled out from the rivet head side, the end of the sleeve is pushed by the mandrel head, the diameter of the end of the sleeve is enlarged, the rivet head is squeezed from the outer circumferential surface, the inner diameter of the rivet head engages the stem of the mandrel, and the members to be fastened are fastened between the enlarged end of the sleeve and the washer.

Preferably, the hardness of the washer is greater than the hardness of the rivet body.

The rivet body and the washer are separate components. When the rivet head is squeezed and fastened, the rivet head is deformed, and the stem of the mandrel is engaged. At this time, the washer, which is harder than the rivet body, is not plastically deformed, and the members to be fastened can be fastened together using sufficient crimping force.

Preferably, the washer is made of steel or stainless steel having a yield strength from 560 MPa to 1000 MPa, or a hardness from Hv270 to Hv480.

When the washer has this yield strength or hardness, it is not plastically deformed when the rivet head is squeezed and pushed out.

Preferably, the thickness of the washer is from 0.8 mm to 2.4 mm and the outer diameter is from 7.5 mm to 22.5 mm in a case in which the inner diameter of the first fastening hole is 5.4±0.1 mm and the outer diameter of the rivet body is 5.2±0.1 mm.

When the washer has these dimensions, it is not plastically deformed when the rivet head is squeezed and pushed out.

A third aspect of the present invention is a method for fastening together using a blind rivet a first member to be fastened having a plurality of first fastening holes, and a second member to be fastened having a plurality of second fastening holes arranged on the working side of the first member to be fastened in positions corresponding to the first fastening holes, the second fastening holes having an inner diameter greater than the inner diameter of the first fastening holes so as to be able to compensate for any position error that may occur during the machining of the first fastening holes and the second fastening holes, in which the method includes:

a rivet body having a hollow sleeve, a rivet head formed on one end of the sleeve, and a through-hole formed so as to pass through the rivet body from the sleeve-side end to the rivet head-side end, a mandrel having an elongated stem whose outer diameter is smaller than the inner diameter of the sleeve and whose length is greater than the rivet body, and a head whose outer diameter is greater than the inner diameter of the sleeve, and a washer whose inner diameter is smaller than the outer diameter of the rivet head and greater than the outer diameter of the sleeve in the rivet body, and whose outer diameter is greater than the outer diameter of the rivet head are prepared;

in which the head of the mandrel is arranged adjacent to the sleeve-side end of the rivet body, the stem of the mandrel is passed through the through-hole in the rivet body and extended from the rivet head-side end, and the washer is arranged around the outer circumferential surface of the sleeve in the rivet body and adjacent to the rivet head to assemble the rivet body, the mandrel, and the washer and create a blind rivet; and in which the blind rivet is inserted into fastening holes in the members to be fastened from the head of the mandrel, a surface of the washer is brought into contact with a portion of the second member to be fastened surrounding the second fastening hole and, when the rivet head is supported and the stem of the mandrel is pulled out from the rivet head side, the end of the sleeve is pushed by the head of the mandrel, the diameter of the end of the sleeve is enlarged, the rivet head is squeezed from the outer circumferential surface and pushed out, the inner diameter of the rivet head engages the stem of the mandrel, and the members to be fastened are fastened between the enlarged end of the sleeve and the washer.

The present invention can provide a blind rivet able to fasten together members to be fastened with sufficient crimping force, even when the inner diameter of the fastening hole in the members to be fastened is larger than the outer diameter of the rivet head. It can also provide a blind rivet able to reduce the number of components and make the fastening process easier.

In addition, the present invention can provide a blind rivet able to fasten together members to be fastened with sufficient crimping force, even when the inner diameter of the fastening holes in one of the members to be fastened is larger than the inner diameter of the fastening holes in the other member to be fastened in order to compensate for any position error in the fastening holes of the members to be fastened.

DETAILED DESCRIPTION OF THE INVENTION

The following is an explanation with reference to the figures of a blind rivet equipped with a washer in an embodiment of the present invention.

Figure 1:
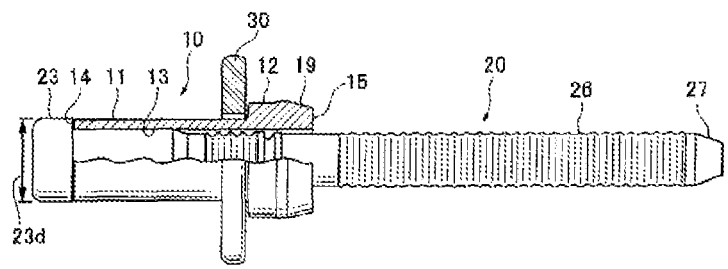
FIG. 1 is a partially cutaway front view of the blind rivet in an embodiment of the present invention.

FIG. 1 is a partially cutaway front view of the blind rivet in an embodiment of the present invention. The blind rivet includes a rivet body 10, a mandrel 20, and a washer 30. The mandrel 20 is inserted into a through-hole 13 in the rivet body 10 from the sleeve-side end 14 of the rivet body 10, and the head 23 of the mandrel 20 is arranged adjacent to the sleeve-side end 14 of the rivet body 10. The washer 30 is inserted over the outer peripheral surface of the sleeve 11 from the sleeve-side end 14 of the rivet body 10, and arranged adjacent to the rivet head 12. There is space between the sleeve 11 and the washer 30.

Figure 2:
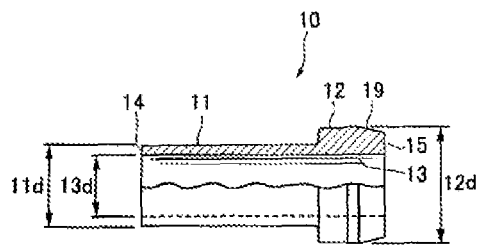
FIG. 2 is a partially cutaway front view of the rivet body of the blind rivet in FIG. 1.
Figure 3:
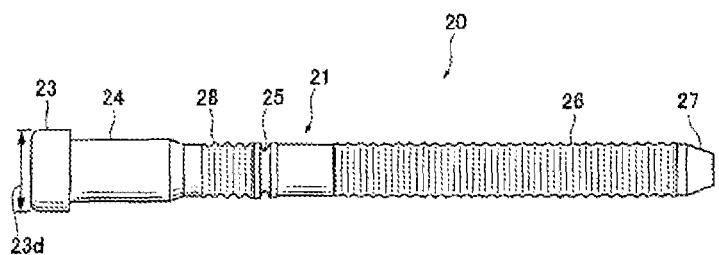
FIG. 3 is a front view of the mandrel for the blind rivet in FIG. 1.
Figure 4:
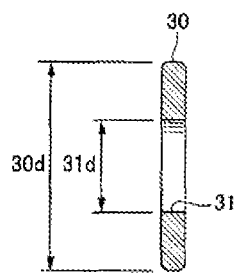
FIG. 4 is a cross-sectional view of the washer for the blind rivet in FIG. 1.

The following is an explanation with reference to FIG. 2 through FIG. 4 of the rivet body 10, mandrel 20, and washer 30 constituting the blind rivet in this embodiment of the present invention.

FIG. 2 is a partially cutaway front view of the rivet body 10 used in the blind rivet in this embodiment of the present invention. The rivet body 10 includes a cylindrical sleeve 11, and a rivet head 12 formed at one end of the sleeve 11 and having a diameter greater than the sleeve 11. The leading end of the rivet head 12 is an inclined portion 19 whose outer diameter becomes smaller in a tapered shape and ends at the rivet head-side end 15. When the blind rivet is fastened, the inclined portion 19 is squeezed by the nosepiece 50 of the fastening tool from the outer circumferential surface, and both the outer diameter and the inner diameter become smaller.

The end of the sleeve 11 on the side opposite that of the rivet head 12 is the sleeve-side end 14. A through-hole 13 extends through the rivet body 10 from the rivet head-side end 15 to the sleeve-side end 14. The inner diameter 13$d$ of the through-hole 13 is large enough for the stem 21 of the mandrel 20 to be inserted, but is smaller than the outer diameter of the head 23 of the mandrel 20 so that the head 23 comes into contact with the sleeve-side end 14 and stops.

The outer diameter 11$d$ of the sleeve 11 is smaller than the inner diameter of the fastening holes in the members to be fastened and is large enough to pass through the fastening holes. The outer diameter of the rivet head 12 is 12$d$.

The rivet body 10 is made of a material that is softer than that of the mandrel 20 such as aluminum or an aluminum alloy. Alternatively, it can be made out of the same material as the mandrel 20 such as steel.

FIG. 3 is a front view of the mandrel 20 set in the blind rivet in this embodiment of the present invention. The mandrel 20 has an elongated stem 21 and a head 23 on one end of the stem 21. The outer diameter 23$d$ of the head 23 is greater than the inner diameter 13$d$ of the through-hole 13 in the rivet body 10. The outer diameter 23$d$ of the head 23 is smaller than the inner diameter of the fastening holes in the members to be fastened 44, 41, and can pass through the fastening holes. The stem 21 is column shaped, has an outer diameter smaller than the inner diameter 13$d$ of the through-hole 13 in the rivet body 10, and can be inserted into the through-hole 13. The length of the stem 21 is greater than the length of the through-hole 13 in the rivet body 10, and the leading end of the stem 21 extends from the rivet head-side end 15 of the rivet body 10 when the stem 21 of the mandrel 20 is inserted into the through-hole 13 in the rivet body 10.

The stem 21 of the mandrel 20 includes from the head 23 side a column-shaped portion 24, an engaging portion 28, a breakable portion 25, a gripped portion 26, and a tip 27. The column-shaped portion 24 is adjacent to the head 23.

The engaging portion 28 is adjacent to the column-shaped portion 24. Circumferential grooves are formed at a predetermined interval in the engaging portion 28, forming engagement ridges between the grooves. When the blind rivet is fastened, the portion with the rivet head 12 is pushed by the nosepiece of the fastening tool from the outer circumferential surface, and its inner diameter becomes smaller. The engagement ridges of the engaging portion 28 engage the inner circumference of the through-hole 13 with a reduced inner diameter and become engaged. This generates strong crimping force, which securely fastens the members to be fastened 44, 41. Here, the crimping force is the force pushing the members to be fastened in the axial direction of the blind rivet.

The breakable portion 25 is adjacent to the engaging portion 28, and has an outer diameter smaller than that of the engaging portion 28. When the blind rivet is assembled, the breakable portion 25 is received in the through-hole 13 of the sleeve 10. When the stem 21 of the mandrel 20 is pulled out by the fastening tool and a certain pulling force is exceeded, the stem breaks off at the breakable portion 25.

A gripped portion 26 with a diameter greater than that of the breakable portion 25 is adjacent to the breakable portion 25. Multiple levels of engagement grooves are formed in the gripped portion 26 so that the gripping member 51 of the fastening tool does not slip when gripping the gripped portion. The tip 27 is at the end of the stem 21, and is slender so that it can be easily inserted into the fastening tool. The mandrel 20 can be made from a material such as steel.

FIG. 4 is a cross-sectional view of the washer 30 used in the blind rivet in this embodiment of the present invention. The washer 30 is a component with a disk-shaped cross-section and a round center hole 31 open in the center in the axial direction. The inner diameter 31$d$ of the center hole 31 is slightly larger than the outer diameter 23$d$ of the head 23 of the mandrel 20, and slightly larger than the outer diameter 11$d$ of the sleeve 11. The washer 30 can be inserted over the outer circumferential surface of the sleeve 11 from the end of the mandrel 20 with the head in the blind rivet when the mandrel 20 and rivet body 10 have been assembled. The inner diameter 31$d$ of the center hole 31 is large enough to move over the outside of the sleeve 11 while leaving a space between the washer 30 and the sleeve 11. The outer diameter of the washer 30 is 30$d$.

The washer 30 has to be rigid enough to resist the load when the rivet head 12 of the rivet body 10 is squeezed and pushed out and to fasten the members to be fastened with large fastening holes with sufficient crimping force. The washer 30 is made from a material that is harder than that of the rivet body 10.

The washer is made of steel or stainless steel having a yield strength from 560 MPa to 1000 MPa, or a hardness from Hv270 to Hv480. When the yield strength is less than 560 MPa, the washer is too weak and is likely to become deformed during fastening. When the strength is less than Hv270, the washer is too weak and is likely to become deformed during fastening. When the yield strength is greater than 1000 MPa, the washer is difficult to machine. When the strength is greater than Hv480, the washer is difficult to machine.

Outer Diameter of Rivet Body in Blind Rivet: 5.2 mm
Inner Diameter of Fastening Hole in Member on Blind Side: φ5.4±0.1 mm
Inner Diameter of Fastening Hole in Member on Working Side: 9 mm (Clearance Hole)

When members to be fastened are fastened together using a blind rivet under these dimensional conditions, the washer has to satisfy the following dimensional conditions.

Thickness: 0.8 mm-2.4 mm
Outer Diameter: φ13.0 mm-22.5 mm

When the thickness is less than 0.8 mm, the washer is weak and likely to become deformed. When the thickness is greater than 2.4 mm, the fastened portion is too thick and operability is poor.

In a case in which the outer diameter is less than 13.0 mm and there is a shift in the fastening holes, the washer cannot cover the fastening hole, and sufficient pressure is not applied to the members to be fastened. When the outer diameter is greater than 22.5 mm, the fastened portion is too thick and operability is poor.

When a washer made of a material and having a thickness and outer diameter meeting the conditions mentioned above is used, members to be fastened can be fastened using sufficient crimping force.

In a case in which the outer diameter of the rivet body in an embodiment of the present invention and the inner diameter of the fastening holes in the members to be fastened are different, the members to be fastened can be fastened together with sufficient crimping force if the material, thickness, and an outer diameter of the washer meet the conditions mentioned above.

Figure 5A:
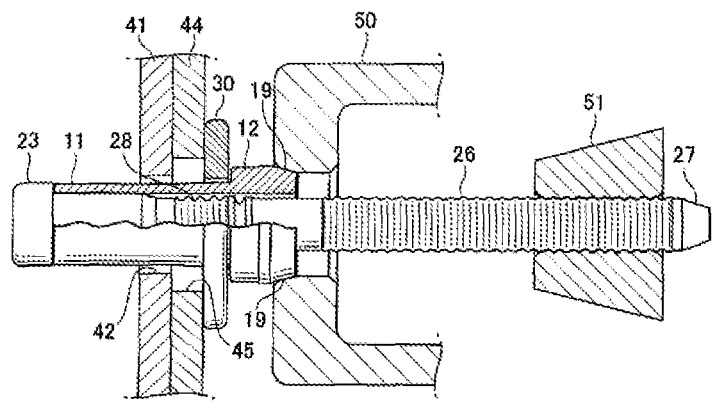
FIG. 5A is a partially cutaway front view of the blind rivet in the embodiment of the present invention in FIG. 1 inserted into fastening holes in members to be fastened.

The following is an explanation with reference to FIG. 5A through FIG. 5D of the operation performed to fasten together the members to be fastened 44, 41 using the blind rivet with a washer in the embodiment of the present invention shown in FIG. 1. FIG. 5A is a partially cutaway front view of the blind rivet with a washer in the embodiment of the present invention in FIG. 1 set inside the members to be fastened 44, 41. In FIG. 5A, the left side is the blind side, and the blind rivet is inserted from the right side (working side). FIG. 5A through FIG. 5D show a single fastened portion. However, a plurality of fastening holes 42 in a member to be fastened 41 and a plurality of fastening holes 45 in another member to be fastened 44 can be aligned in corresponding positions. The fastening hole 45 in one of the members to be fastened 44 is a clearance hole, which is larger than the fastening hole 42 in the other member to be fastened 41 in order to compensate for any position error in the fastening holes.

In FIG. 5A, the inner diameter 45 of the member to be fastened 44 is greater than the outer diameter 12d of the rivet head 12. In the embodiment of the present invention, a flange integrated with the rivet head 12 is not formed. Because a separate washer 30 having an outer diameter greater than the inner diameter of the fastening hole 45 in the member to be fastened 44 is used, the members to be fastened 44, 41 can be fastened together with strong crimping force.

The members to be fastened 44, 41 overlap so that the position of the fastening hole 45 in the member to be fastened 44 and the position of the fastening hole 42 in the member to be fastened 41 are aligned.

The gripped portion 26 of the mandrel 20 in the blind rivet in FIG. 1 assembled from the rivet body 10, the mandrel 20, and the washer 30 is gripped by the gripping member 51 of the fastening tool. A space remains between the washer 30 and the sleeve 11 of the rivet body 10. The blind rivet in FIG. 1 is inserted into the fastening holes in the members to be fastened 44, 41 from the right in FIG. 5A, and the washer 30 mounted on the rivet body 10 is brought into contact with the surface of the member to be fastened 44 surrounding the fastening hole 45. The inner circumferential surface of the nosepiece 50 of the fastening tool comes into contact with the inclined portion 19 near the tip of the rivet head 12 in the rivet body 10.

Figure 5B:
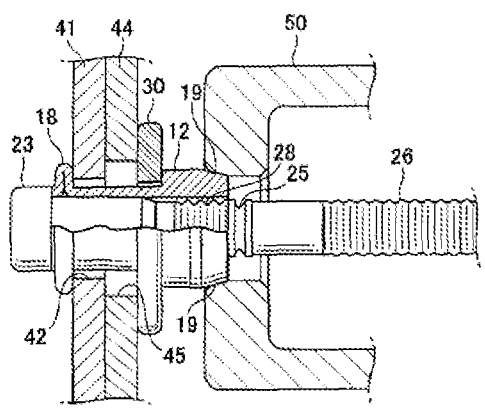
FIG. 5B is a partially cutaway front view of an intermediate stage during which members to be fastened are being fastened together using the blind rivet in FIG. 1.

FIG. 5B is a partially cutaway front view of an intermediate stage during which the members to be fastened 44, 41 are being fastened together using the blind rivet. While the inclined portion 19 near the top of the rivet head 12 in the rivet body 10 is being held by the nosepiece 50 of the fastening tool, the gripped portion 26 of the mandrel 20 is gripped by the gripping member 51 of the fastening tool and is pulled out. At this time, the head 23 of the mandrel 20 is pulled and buried in the sleeve-side end 14 of the sleeve 11 of the rivet body 10, and forms an enlarged portion 18. The enlarged portion 18 makes contact with the member to be fastened 41 surrounding the fastening hole 42.

Figure 5C:
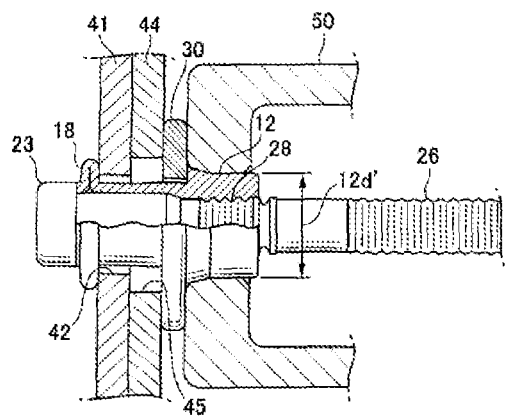
FIG. 5C is a partially cutaway front view of an intermediate stage during which members to be fastened are being fastened together using the blind rivet in FIG. 1.

FIG. 5C is a partially cutaway front view of an intermediate stage during which the gripped portion 26 of the mandrel 20 is pulled out and the fastening operation continues. As the nosepiece 50 continues to press against the inclined portion 19 of the rivet head 12 from the outer circumferential surface, the outer diameter 12d of the rivet head 12 is deformed and becomes smaller outer diameter 12d'. At this time, the inner circumferential surface of the through-hole 13 in the head 12 portion is deformed, becomes smaller than inner diameter 13d, and engages the engaging portion 28 of the mandrel 20. The end face of the nosepiece 50 then makes contact with the surface of the washer 30 and stops. The blind rivet interposes the members to be fastened 44, 41 between the enlarged portion 18 and the washer 30.

Figure 5D:
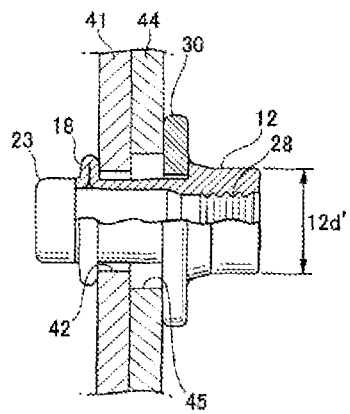
FIG. 5D is a partially cutaway front view after members to be fastened have been fastened together using the blind rivet in FIG. 1.

FIG. 5D is a partially cutaway front view after the gripped portion 26 of the mandrel 20 has been pulled out farther and the members to be fastened have been completely fastened. The mandrel 20 breaks off at the breakable portion 25, and the fastened section from the breakable portion 25 to the head 23 remains. Because the inner circumferential surface of the rivet head 12 in the rivet body 10 is engaged by the engaging portion 28 of the mandrel 20, the portion can be fastened securely. Afterwards, the nosepiece 50 is removed to the right in FIG. 5D, and the fastening operation is complete.

When the members to be fastened have been fastened together by the blind rivet, the inner diameter of the fastening holes of the members to be fastened is smaller than the outer diameter 12d of the rivet head 12. In this embodiment, the inner diameter of the fastening holes 45 is larger than the outer diameter 12d of the rivet head 12, but a washer 30 is attached having an outer diameter 30d greater than the inner diameter of the fastening holes 45. As a result, the washer 30 comes into contact with the member to be fastened 44 on the outer periphery of the fastening hole 45, and the members to be fastened 44, 41 can be fastened.

Because there is a space between the washer 30 and the sleeve 11 before fastening, the force squeezing the rivet head 12 and pushing it out in the axial direction is not blocked by the washer 30. As a result, strong crimping force is generated in the axial direction, and the members to be fastened 44, 41 can be fastened together using strong crimping force.

Figure 6:
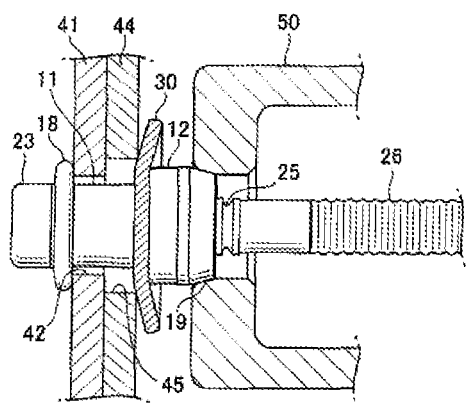
FIG. 6 is a front view of the washer becoming deformed in an intermediate stage during which members to be fastened are being fastened together using the blind rivet in FIG. 1.

FIG. 6 is a front view of a washer with insufficient strength becoming deformed in an intermediate stage during which the members to be fastened are being fastened together using the blind rivet in FIG. 1. The washer has to be rigid enough to resist the load when the rivet head is squeezed and pushed out. The washer becomes plastically deformed during an intermediate stage of the fastening process when it has insufficient rigidity. The washer has to meet the material, thickness, and outer diameter conditions mentioned above in order to prevent plastic deformation and obtain sufficient crimping force.

The blind rivet of the present invention is able to fasten together members to be fastened with sufficient crimping force, even when the inner diameter of the fastening hole in the members to be fastened is larger than the outer diameter of the rivet head. It can also reduce the number of components and make the fastening process easier.

In addition, the blind rivet of the present invention is able to fasten together members to be fastened with sufficient crimping force, even when the inner diameter of the fastening holes in one of the members to be fastened is larger than the inner diameter of the fastening holes in the other member to be fastened in order to compensate for any position error in the fastening holes of the members to be fastened.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A blind rivet adapted to be connected to, and for fastening together, a plurality of members to be fastened having fastening holes by using a rivet-setting tool, comprising:
   a rivet body having a hollow sleeve and a sleeve-side end, a rivet head integrally formed on one end of the sleeve and being squeezable by the rivet-setting tool, and a through-hole formed so as to pass through the rivet body from the sleeve-side end to the rivet head-side end,
   the hollow sleeve having an axial length,
   a mandrel having an elongated stem whose outer diameter is smaller than the inner diameter of the sleeve and whose length is greater than the rivet body, and a head whose outer diameter is greater than the inner diameter of the sleeve,
   the mandrel stem defining a gripping portion adapted to be gripped by the rivet-setting tool,
   a non-plastically deformable washer whose inner diameter is smaller than the outer diameter of the rivet head and greater than the outer diameter of the sleeve in the rivet body, and whose outer diameter is greater than the outer diameter of the rivet head,
   wherein the head of the mandrel is arranged adjacent to the sleeve-side end of the rivet body, the stem of the mandrel being disposed through the through-hole in the rivet body and extends from the rivet head-side end, and the washer is arranged around the outer circumferential surface of the sleeve in the rivet body and adjacent to the rivet head, and
   wherein the blind rivet is inserted into the fastening holes in the members to be fastened from the head of the mandrel, and a surface of the washer engages a portion of the member to be fastened nearest the rivet head such that the washer surrounds the fastening holes such that the washer prevents the rivet head and the washer itself from entering the fastening hole of the member to be fastened nearest the rivet head, wherein
   the axial length of the rivet body hollow sleeve being long enough to axially extend from the rivet head through the washer, through both members to be fastened, and to extend sufficiently axially outwardly of the members to be fastened as to allow a portion of the extended sleeve to be deformed between the mandrel head and the members to be fastened, while permitting the rivet head to be squeezed onto the gripping portion of the mandrel stem, when the rivet-setting tool pulls the mandrel stem and engages the rivet head, so that the rivet can be fastened to the members to be fastened, such that the rivet is not removable from the members to be fastened except by destroying the rivet.

2. A blind rivet according to claim 1 wherein the hardness of the washer is greater than the hardness of the rivet body.

3. A blind rivet according to claim 1 wherein the washer is made of steel or stainless steel having a yield strength from 560 MPa to 1000 MPa, or a hardness from Hv270 to Hv480.

4. A method for fastening together using a blind rivet a first member to be fastened having a plurality of first fastening holes, and a second member to be fastened having a plurality of second fastening holes arranged on the working side of the first member to be fastened in positions corresponding to the first fastening holes, the second fastening holes having an inner diameter greater than the inner diameter of the first fastening holes so as to be able to compensate for any position error that may occur during the machining of the first fastening holes and the second fastening holes, the rivet including a rivet body having a hollow sleeve having an axial length, a rivet head integrally formed on one end of the sleeve, and a through-hole formed so as to pass through the rivet body from the sleeve-side end to the rivet head-side end, the rivet further including a mandrel having an elongated stem whose outer diameter is smaller than the inner diameter of the sleeve and whose length is greater than the rivet body, and a head whose outer diameter is greater than the inner diameter of the sleeve, and still further including a non-plastically deformable washer whose inner diameter is smaller than the outer diameter of the rivet head and greater than the outer diameter of the sleeve in the rivet body, and whose outer diameter is greater than the outer diameter of the rivet head, the method comprising:
   arranging the head of the mandrel adjacent to the sleeve-side end of the rivet body,
   passing the stem of the mandrel through the through-hole in the rivet body so that the stem of the mandrel extends from the rivet head-side end,
   arranging the washer around the outer circumferential surface of the sleeve in the rivet body and adjacent to the rivet head,
   thereby assembling the rivet body, the mandrel, and the washer into a blind rivet subassembly,
   inserting from the head of the mandrel the blind rivet subassembly into aligned fastening holes in the members to be fastened such that a surface of the washer is brought into contact with a portion of the second member to be fastened so that the washer surrounds the second fastening hole, thereby preventing the rivet head and the washer itself from entering the second fastening holes, and so that the sleeve extends from the rivet head axially through the washer, the members to be fastened, and out to the head of the mandrel,
   supporting the rivet head,
   pulling out the stem of the mandrel from the rivet head side so that the end of the sleeve is pushed by the head of the mandrel to enlarge the end of the sleeve,
   squeezing the rivet head from the outer circumferential surface so that so that the rivet head is pushed out and the inner diameter of the rivet head is squeezed upon the stem of the mandrel,
   whereby the rivet fastens the members to be fastened between the enlarged end of the sleeve and the washer, and is not removable therefrom except by destroying the rivet.

5. A method according to claim 4 wherein the washer has a thickness of from 0.8 mm to 2.4 mm and an outer diameter from 7.5 mm to 22.5 mm in a case in which the inner diameter of the first fastening hole is 5.4±0.1 mm and the outer diameter of the rivet body is 5.2±0.1 mm.

* * * * *